July 25, 1972   M. HUER ETAL   3,679,537
PACKING ELEMENTS FOR MATERIALS-INTERCHANGE COLUMN
Filed Aug. 7, 1968   2 Sheets-Sheet 1

Inventors:
MAX HUBER
WERNER MEIER

BY
Kenyon & Kenyon
ATTORNEYS

Inventors:
MAX HUBER
WERNER MEIER

United States Patent Office 3,679,537
Patented July 25, 1972

3,679,537
PACKING ELEMENTS FOR MATERIALS-INTERCHANGE COLUMN
Max Huber and Werner Meier, Winterthur, Switzerland, assignors to Sulzer Brothers, Ltd., Winterthur, Switzerland
Filed Aug. 7, 1968, Ser. No. 750,938
Claims priority, application Switzerland, Aug. 16, 1967, 11,527/67; June 24, 1968, 9,362/68
Int. Cl. B01d 25/04, 35/00, 39/08; B32b 3/28
U.S. Cl. 161—135                                    7 Claims

ABSTRACT OF THE DISCLOSURE

The packing elements are formed of lamella or strips which are constructed of reinforced non-self-supporting woven structure. The reinforcement is provided by wires which are disposed on opposite sides of the woven structure and spot welded together. Where the woven structure is corrugated, the transverse wires are disposed in the troughs of the corrugations. Intermediate layers of flat woven structure can be used between corrugated layers in forming the packing elements.

---

This invention relates to packing elements for materials-interchange columns. More particularly, this invention relates to the construction of a lamella or strip of material for use in a packing element.

Materials-interchanging columns have been known and used for distillation, rectification, absorption, regeneration, extraction, moistening, cooling, drying, and for effecting chemical reactions, such for example as separating isotopic substances out of a substance on the basis of a chemical interchanging reaction, for example, for the separation of deuterium and hydrogen. The separation of molecules formed with various isotopes, heavy and light water for example, can self-evidently also be performed in an interchanging column of this kind. In some instances, these materials-interchange columns have relied on packing elements in the materials-exchange sections that substantially completely fill the cross-section of the columns to carry out the function of the columns. Some of these packing elements are made as so-called coiled elements. In order to produce such packing elements, diagonally corrugated bands made from wire mesh or wire fabric are rolled up spirally, whereby the adjacent layers are in point-contact along the corrugation.

Another known form of construction of packing elements (particularly suitable for obtaining excellent gas distribution across the column cross-section) consists of a plurality of corrugated mutually-contacting lamellae layered in parallel planes, whereby the corrugation of adjacent lamellae, after insertion of the elements into the column, lies at an acute angle to the column axis. With this form of construction, the materials-interchanging part of the column is filled up with at least two superposed packing elements, whereby the vertical positions of the lamellae disposed over one another are deviated by an angle around the column axis.

Heretofore, it has been known to produce the lamellae for these known packing elements, for example from a textile fabric which is stiffened by interwoven metal wires. However, such a method of making the lamella entails a relatively high expenditure, on account of the necessarily complicated design of the weaving machine. Further, because only very fine wires can be woven in with textile threads due to weaving-technology reasons, such fine wires may very easily become destroyed through corrosion during operation, so that the required retention of the shape of the lamellae is no longer ensured. Also, because of deformations, the decisive good mixing effect in the interchange of materials required for the liquid and gaseous phases pervading the column cross section can no longer be obtained. In a general way it may be said that, apart from the dangers of corrosion impairing such textile fabrics reinforced by woven-in fine metal wires, these fabrics already do not have a very good stiffness, and therefore it is difficult to obtain precise corrugations of the desired dimensions.

In order to overcome such disadvantages of textile fabric, metal has been used. However, the production of packing-element lamellae or strips of metal weave or metal fabric entails relatively high costs on account of the great consumption of metal-wire material. Further, such can be greatly impaired or, under certain circumstances, even destroyed by liquids treated in the column, for example, a lye or an acid.

Accordingly, it is an object of the invention to provide a packing element of corrosion resistant material.

It is another object of the invention to provide a packing element which retains its shape.

It is another object of the invention to provide a packing element which is relatively inexpensive to make.

Briefly, the invention provides a packing element which is made of non-self-supporting mesh material and reinforcement for supporting the mesh material.

The mesh material is formed as lamellae or strips which are corrugated and is made, for example, of fabrics woven from glass fibers. By being made of such fabric, the mesh material, on one hand has the advantage of being greatly resistant to corrosion while, on the other hand, during operation, the material becomes very well wetted by the liquid. Because the weft threads and the warp threads consist of twisted glass filaments, capillary forces can become formed between each of the filaments forming a thread, in the presence of a liquid, sufficient to provide for self-wetting of the fabric. With one type of weaving with open meshes (where "meshes" means the openings between opposite warp and weft threads), the inside width of the meshes having an order of magnitude of not more than 0.1 to 0.2 mm., and in the presence of a liquid, a stretched film of liquid is formed across the open meshes. This is advantageous in obtaining a good materials interchange in a column, because the gas phase interchanging with the liquid comes into contact with the liquid at both surfaces of the film.

The reinforcement is formed of two groups of parallel spaced apart wires with the wires of one group being disposed transversely of the wires of the other group. Further, some of the wires are on one side of the mesh material while the remainder are on the opposite side so as to sandwich the mesh material therebetween. Also, the wires are bonded together through the mesh material at the respective points of intersection of the wires.

In accordance with one embodiment of carrying out the invention, excellent shape-retention of the lamellae or strips of mesh material is obtained when a part of the reinforcement is formed of a group of wires shaped to correspond to the corrugation of the mesh material so as to receive the material on one side, and when the other part of the reinforcement consists of a group of wires which are laid in the recesses of the individual corrugations on the other side of the material. It may hereby be advantageous, particularly when the spacing of the wires is relatively great, and for further improvement of the shape-retention and for preventing deformations of the lamellae or strips, to lay in the recesses of the corrugations, at the side of the first group of wires, a third group of wires, whereby the first and third group, at at least a part of their crossings, are bonded together directly.

In comparison with the layers for packing elements made of fabrics made entirely of wires, or made of textile fabrics having interwoven wires, the invention makes it possible to use wires of substantially greater diameter, for example, of 0.5 mm. and more, for the reinforcement so that these wires are far less endangered by corrosion than the fine wires of the known forms of construction. The wires forming a supporting framework or skeleton may be spaced relatively far apart. Thus, tests have shown that in the use of a textile fabric, itself not self-supporting, for the layers of a packing element, a wire spacing of about 1 cm. produces excellent stiffness. Depending on the dimensions desired for the corrugation, the wire spacing may on occasion be made still greater, so that with a relatively small expenditure for work it is possible to produce the supporting skeleton.

Advantageously, the wires are bonded together at their crossings by spot-welding. Such metallic bonds, which may on occasion be made by soldering, impart to the supporting skeleton and the connected not self-supporting structure substantially greater shear strength than can be reached through weaving metal wires in.

These and other objects of the invention will become more apparent from the following detailed description taken in conjunction with the accompanying drawings in which.

Figure 1:
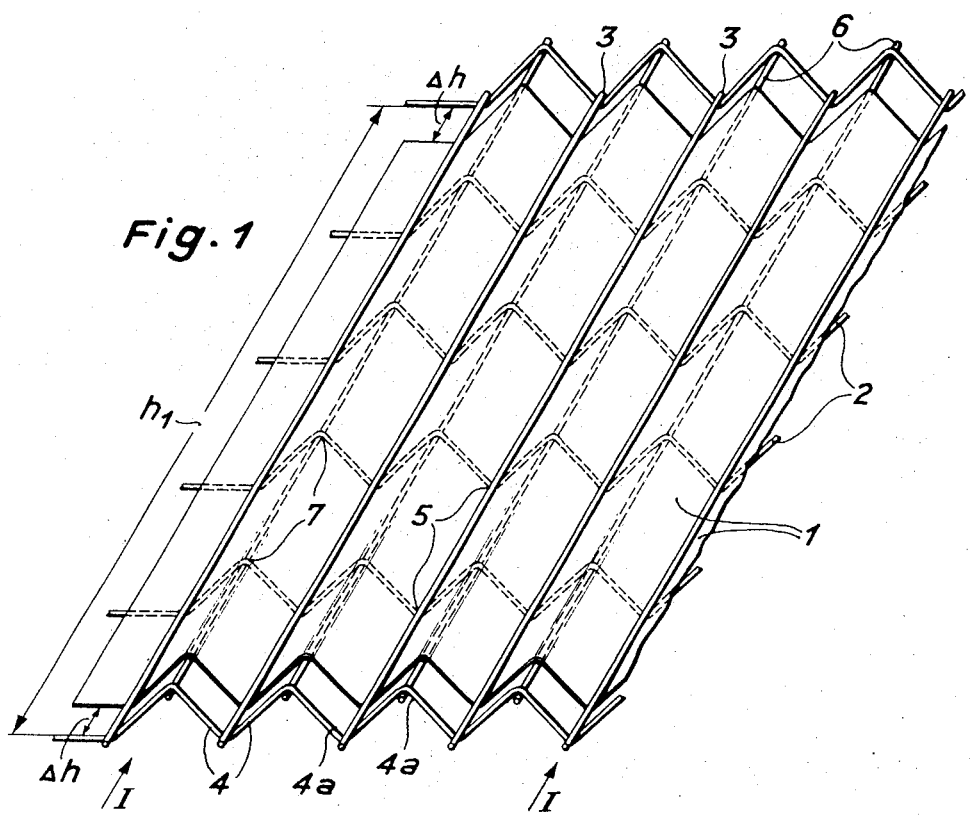
FIG. 1 illustrates a perspective view of a corrugated lamella for a packing element made according to the invention.
Figure 1A:
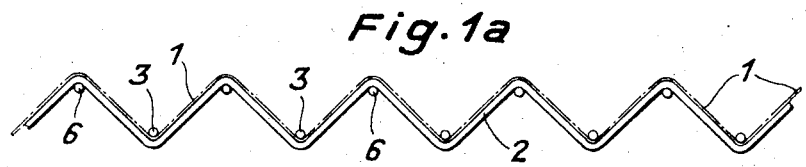
FIG. 1a illustrates an end view of the lamella of FIG. 1.

Referring to FIGS. 1 and 1a, lamella is formed of a strip of mesh material 1 and reinforcing wires 2, 3 stretched across the mesh material 1. The mesh material 1 is made of open mesh woven fabric of non-self-supporting glass threads. Alternatively, the mesh material can be made of asbestos, textile or synthetic material fabric or, under certain conditions, a foil of synthetic material. Further, the mesh material 1 is corrugated with either a zig-zag or undulating profile. One group of reinforcing wires 2 is shaped to match and lie in the corrugations of the mesh material 1 on one side while another group of reinforcing wires 3 is straight and press the reinforcing wires 2 against the surface of the mesh material 1. The group of wires 3 is disposed on the opposite surface of the mesh material 1 longitudinally within the troughs 4a formed by the corrugations 4 and bonded, as by spot welding, to the wires 2 at the points of intersection 5 through the mesh material 1.

The reinforcing wires 2 are spaced apart a distance which is a multiple of the mesh-width of the mesh material. For example, for an inner mesh width of 0.1 mm., the wires 2 are spaced in the order of 10 mm. and more. In the event that the wires 2 are at a relatively large spacing, in order to prevent dimpling of the mesh material 1, a third group of wires 6 is laid in the troughs of the corrugations of the wires 2 on the opposite side of the mesh material 1 from the wires 3. The third group of wires 6 is directly connected to the wires 2 at the points of intersection 7 as by spot welding.

As shown, the wires 2, 3, 6 extend beyond two opposite edges of the mesh material 1 by an amount $\Delta h$; the total height (or length) of the material 1 being $h_1$. The lamella thus has two opposite edge zones that consist exclusively of a wire skeleton. When packing elements are made from such lamella and are superposed vertically in a column so that the edge zones of two adjacent packing elements are in contact, clear spaces without conductive surfaces for the gas phase are formed in the column transversely of the longitudinal axis of the column. The upwardly flowing gas phase in the column is thus able to become mixed in such intermediate spaces after passing through that part of the packing element formed of mutually contacting layers of mesh material forming conducitve surfaces for both the liquid and gas phases. This mixing allows equalization of any concentration differences. Further, such intermediate spaces can also serve, for example, in the case of continuously operating rectification columns, as a place to feed in the mixture that is to be rectified.

Figure 2:
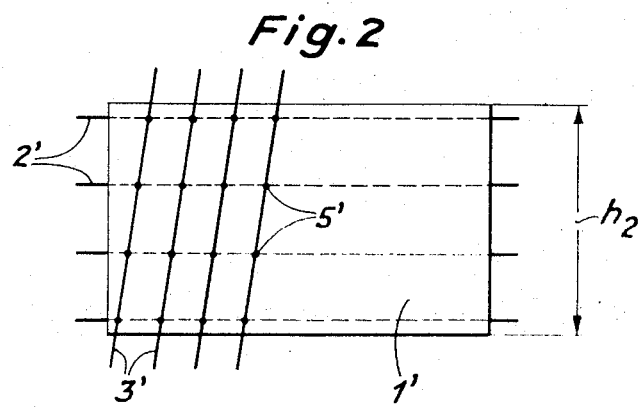
FIG. 2 illustrates a plan view of a modified lamella according to the invention.

Referring to FIG. 2, the lamella can be formed in an alternative manner by initially constructing the mesh material 1' and reinforcement wires 2', 3' in a flat shape with the wires 2', 3'; being bonded together at the points of intersection 5' through the mesh material 1', as by spot welding. Thereafter, the fabrication proceeds with a subsequent step wherein the flat lamella is corrugated so that the wires 3' on one side of the mesh material 1' become disposed in the region of the troughs of the corrugations of the other group of wires 2' on the other side of the mesh material 1'. The width $h_2$ of the flat lamella should correspond approximately to the height of one layer of the packing element made therefrom.

When use is made of a mesh material made of glass threads, it is advantageous in the production of the individual lamella for a packing element to melt the longitudinal edges of the glass thread material with a small gas flame to prevent unravelling.

Figure 3:
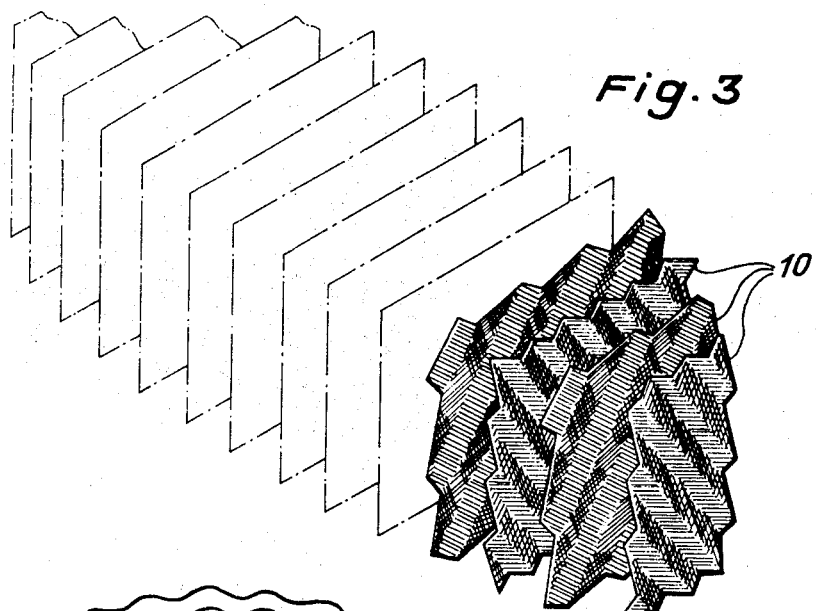
FIG. 3 illustrates a perspective view of a plurality of lamellae for forming a packing element according to the invention.

Referring to FIG. 3, the lamellae 10 are constructed, as above, with a glass thread fabric mesh material having a wire-like reinforcement that ends at opposite edges of the fabric. The lamellae 10 are shown in the sequence in which they are set adjoining one another, are then combined into a packing element, and are finally pushed into the materials-exchanging part of a cylindrical column. The individual lamellae 10 are of different sizes which diminish from the center to both outer sides so as to form a cylindrical packing element when assembled. Also, the adjacent lamellae 10 are disposed so that the corrugations of each pair of adjacent lamellae intersect.

Figure 3A:
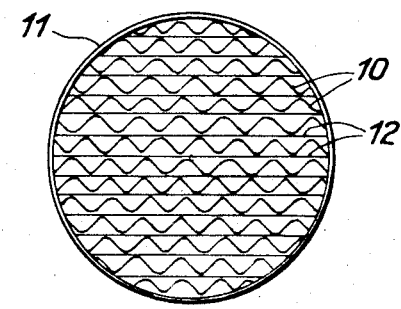
FIG. 3a illustrates a cross-sectional view of a materials-interchanging section of a column in accordance with the invention.

Referring to FIG. 3a, in order to increase the surface without changing the volume, a flat lamella 12 is inserted between each pair of corrugated lamellae 10. Each flat lamella 12 is similar to the corrugated lamella 10, except for the corrugations, in that each consists of a glass fiber fabric which is reinforced with wires. The packing element constructed with such alternating flat and corrugated lamellae 10, 12 is placed within a column 11 perpendicularly of the column axis. For large diameter columns, each packing element can be made of a number of partial elements which are held together, for example, by a sheet-metal framework of the height of the lamellae.

Figure 4:
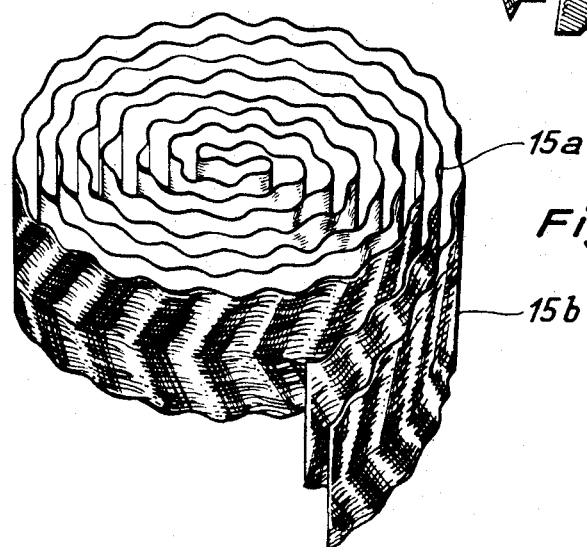
FIG. 4 illustrates a perspective view of a spirally wound strip of mesh material according to the invention.

Referring to FIG. 4, a packing element can be formed of a spirally coiled strip 15 which is formed, as above, with a strip of textile mesh material reinforced by reinforcing wires on opposite sides. The coiled packing element is further corrugated with a herringbone corrugation which, in the upper half of the strip, is at an angle from the vertical of 45° and, in the lower half, at an angle of 135°. The strip 15 is bent around in a manner such that a double layered coil 15a, 15b is formed with the two strip ends superposed and such that the corrugations of the two half strips 15a, 15b intersect. The strip is coiled spirally, for example, around a massive core-piece, so that the individual coils are in point contact with one another at their corrugations.

Figure 4A:
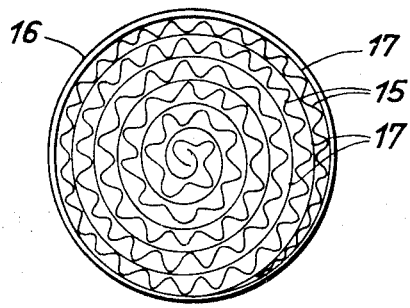
FIG. 4a illustrates a modified materials-interchanging section of a column in accordance with the invention.

Referring finally to FIG. 4a, a column 16 is filled with a number of coiled packing elements formed of a corrugated single layered coil strip 15. In order to increase the conductive surfaces for the liquid treated in the column, an uncorrugated strip 17 of similar construction is coiled within the corrugated strip 15 to form alternate coils of a packing element.

What is claimed is:

1. A packing element for a materials-interchange column comprising a plurality of mutually contacting lamellae, at least each second lamella is corrugated, and each said lamella including non-self-supporting mesh material and reinforcing wires, said reinforcing wires incuding a first group of parallel spaced wires and a second group of parallel spaced wires transverse to said first group, some of the wires are on one side of the said material while the remainder are on the opposite side of the material, the said wires being bonded to each other at least at some of the points of intersection therebetween through said material to form a skeleton.

2. A packing element as set forth in claim 1 wherein said material is formed of textile fabric.

3. A packing element as set forth in claim 1 wherein said material is formed o fa gabric of glass threads.

4. A packing element as set forth in claim 1 wherein said material extends over only a part of said skeleton of reinforcing wires.

5. A packing element as set forth in claim 1 wherein said first group of wires of said corrugated lamella is corrugated to correspond to the shape of said corrugated lamella and said second group of wires thereof are disposed longitudinally within the troughs of the corrugation of said corrugated lamella.

6. A packing element as set forth in claim 5 wherein said reinforcing wires includes a third group of wires on said one side of said material, said first and third groups of wires being bonded directly to each other at least at some of the points of intersection therebetween.

7. A packing element as set forth in claim 6 wherein said first and third groups of wires are spot welded at said points of intersection.

References Cited

UNITED STATES PATENTS

| | | | |
|---|---|---|---|
| 425,042 | 4/1890 | Moseley et al. | 161—135 |
| 659,416 | 10/1900 | Perry | 161—84 X |

WILLIAM A. POWELL, Primary Examiner

U.S. Cl. X.R.

55—520, 521; 156—205, 206; 161—89, 93, 137; 210—497.1, 499; 261—100

UNITED STATES PATENT OFFICE
CERTIFICATE OF CORRECTION

Patent No. 3,679,537      Dated July 25, 1972

Inventor(s)    Max Huber et al

It is certified that error appears in the above-identified patent and that said Letters Patent are hereby corrected as shown below:

On the pages of the drawings, correct Applicant's name from "Huer" to --Huber--.

Signed and sealed this 29th day of May 1973.

(SEAL)
Attest:

EDWARD M. FLETCHER, JR.          ROBERT GOTTSCHALK
Attesting Officer                Commissioner of Patents